(12) United States Patent
Tanaka et al.

(10) Patent No.: US 6,404,627 B1
(45) Date of Patent: Jun. 11, 2002

(54) RADIATOR MECHANISM FOR INFORMATION PROCESSOR

(75) Inventors: Atsuko Tanaka; Masuo Ohnishi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/551,390

(22) Filed: Apr. 18, 2000

(30) Foreign Application Priority Data

Aug. 13, 1999 (JP) .......................................... 11-244413

(51) Int. Cl.[7] ................................................ H05K 7/20
(52) U.S. Cl. ...................... 361/687; 361/683; 361/686; 257/719; 174/15.2
(58) Field of Search ................................. 361/683, 685, 361/686, 687, 688–699, 670–674, 700–710, 715, 717–718, 722, 721; 165/80.2, 80.3, 122–126, 80.4, 185, 104.33, 104.26, 104.19, 15.1, 16.1; 174/15.2, 16.3; 257/715, 718, 719, 727, 726; 62/3.3, 3.7, 259.2; 312/223.2; 364/708.1

(56) References Cited

U.S. PATENT DOCUMENTS

| 5,513,070 | A | * | 4/1996 | Xie et al. ..................... 361/700 |
| 5,559,675 | A | * | 9/1996 | Hsieh et al. .................. 361/707 |
| 5,568,360 | A | * | 10/1996 | Penniman et al. ........... 361/687 |
| 5,875,095 | A | * | 2/1999 | Webb ........................... 361/700 |
| 5,973,920 | A | * | 10/1999 | Altic et al. ................... 361/687 |
| 6,043,977 | A | * | 3/2000 | Nakajima .................... 361/687 |
| 6,049,455 | A | * | 4/2000 | Nakamura et al. ........... 361/688 |
| 6,226,180 | B1 | * | 5/2001 | Ueda et al. .................. 165/80.2 |
| 6,301,107 | B1 | * | 10/2001 | Lev et al. ..................... 361/687 |
| 6,304,441 | B1 | * | 10/2001 | Han ............................. 361/687 |

FOREIGN PATENT DOCUMENTS

| JP |  | 11143585 | A | * | 9/1997 | ............. G06F/1/00 |
| JP |  | 11-143585 |  |  | 5/1999 |  |
| JP |  | 11191024 | A | * | 7/1999 | ............. G06F/1/20 |
| JP |  | 2000101007 | A | * | 4/2000 | ......... H01L/23/427 |
| JP |  | 02000228594 | A | * | 8/2000 | ............. H05K/7/20 |
| JP |  | 02000261175 | A | * | 9/2000 | ............. H05K/7/20 |
| JP |  | 02000277964 |  | * | 10/2000 | ............. H05K/7/20 |

* cited by examiner

Primary Examiner—Darren Schuberg
Assistant Examiner—Michael Datskovsky
(74) Attorney, Agent, or Firm—Armstrong, Westerman, & Hattori LLP

(57) ABSTRACT

It is an exemplified object of the present invention to provide a radiator mechanism that efficiently radiates the heat around circuit elements in a compact and lightweight information processor. In order to achieve the above object, in the information processor divided into a display body and a keyboard body via a hinge portion, the keyboard body includes in parallel from a front side in sequence a palm rest section and a keyboard section, a circuit element as a heat source in a housing of the keyboard body, a radiator plate on the circuit element, a first heat pipe between the circuit element and the radiator plate, and the first heat pipe that is connected with a radiator portion that extend from the radiator plate out of the keyboard section, and radiates the heat from the circuit element. According to such a structure, the first heat pipe transfers the heat from the circuit element to the radiator portion in the radiator plate, radiating the heat effectively and efficiently.

20 Claims, 12 Drawing Sheets

RADIATOR MECHANISM FOR INFORMATION PROCESSOR

BACKGROUND OF THE INVENTION

The present invention generally relates to radiator mechanisms for an information processor comprising a display and a keyboard at its two distinct bodies respectively, and more particularly to a radiator mechanism for circuit-derived heat in a portable computer.

Portable computer or portable electronic information terminals, such as notebook personal computers (PCs), tend to generate more calorific values from IC components as their CPUs (central processing units) provide higher speed and higher performance. The increased calorific value should be radiated properly; otherwise the insufficient radiation would disadvantageously allow the heat derived from the CPU and other exoergic components to etc. to cause an unstable operation or malfunction.

On the other hand, the portable computer has been required to reduce its size and weight, and the keyboard body has also been required to reduce its weight and thickness. In general, the portable computer has a plate member under the keyboard such as an aluminum plate for enhancing its strength, and the CPU and other circuit elements on a wiring board are provided under the plate member. Otherwise, a radiator plate may be provided under the plate member for enhancing its strength. On the top of the keyboard body, a palm rest section is formed at a front side of a keyboard section, and a pointing device such as a touch pad, left and right buttons, and the like is provided as well. A battery pack, an expanded memory, and the like may be arranged under these devices, and an expansion unit and a PC card may be inserted and attached into a so-called selectable bay through a sidewall, of the body. Thus, the keyboard body of the information processor is high-densely filled with components, providing the insufficient space around the CPU as a heat source.

A conventional portable computer has radiated the heat from high-densely mounted circuit components in the computer body, using a flat or spherical heat pipe passing through the top of the CPU and other circuit elements. However, the higher increased operation speed and more complex signal processing in the CPU would increase the calorific value to such an extent that a conventional flat or spherical heat pipe itself could not prevent a malfunction or keep the stable operation.

In addition to the increased calorific value in the CPU, the recent trend of a slim structure for the keyboard section contradicts the provision of the radiator plate or heat pipe in addition to the reinforcing aluminum plate under the keyboard, because the radiator plate or heat pipe increases the thickness of the keyboard section, going against the trend toward of a compact and low profile computer.

It is conceivable to provide a dual-purpose radiator and reinforcing plate under the keyboard to radiate the heat from the CPU under the plate through a heat pipe attached to the plate, but the plate is placed under the keyboard, and thus should have too small an area for dissipating heat to keep uniform temperature in the portable computer as a whole. Therefore, it is not efficient in dissipating heat.

In the meantime, one of the challenges for the portable computer is to reduce its thickness. The main body of the portable computer includes the keyboard, and further needs a space for an expansion bay for a battery or expansion unit. Conventionally, the heat pipe is so provided as to occupy substantially the same height in a direction of the thickness of the portable computer, while the expansion bay for the expansion unit is provided under the keyboard section of the portable computer. In such a configuration, supposing the heat pipe is placed from side to side, the expansion unit would possibly collide with the heat pipe when the expansion unit is attached to the expansion bay. The portable computer would thus need to be designed to adjust its thickness on the drawing board so as to avoid such a collision, against the trend toward a low profile computer.

As a mechanism for improving the radiative efficiency, a computer provided with a cooling fan is known in the art, but such provision of the fan would result in upsizing of the apparatus by the same amount as the fan's size, and disadvantageously cause a substantial increase of power consumption in the computer as a whole.

BRIEF SUMMARY OF THE INVENTION

Therefore, in view of the foregoing technical issues, it is an exemplified object of the present invention to provide a novel and useful radiator mechanism for an information processor to efficiently radiate the heat around a circuit element in the compact and lightweight information processor.

In order to achieve the above objects, the radiator mechanism for an information processor according to the present invention comprises a housing, an input portion located in the housing, a circuit element provided in the housing, a radiator plate provided on the circuit element, a first heat pipe provided between the circuit element and the radiator plate, and a radiator portion extending and detouring around the input portion, while the first heat pipe is connected with the radiator portion, and radiates heat from the circuit element. According to this configuration, the first heat pipe transfers heat from the circuit element to the radiator portion on the radiator plate, in which the heat is radiated effectively and efficiently. An example of the above input portion is a keyboard section, and the above radiator portion may be configured to extend under the palm rest section.

According to the preferred embodiment of the present invention, another heat pipe or a second heat pipe is provided near the circuit element in addition to the first heat pipe between the circuit element and the radiator plate. For example, the above heat pipe may be approximately ellipse-shaped in section, the above second heat pipe may be located so that its bottom portion may pass on the above circuit element, and a heat pipe fit-in portion may be formed in accordance with a thickness of the second heat pipe on the radiator plate, and the second heat pipe may fit in the heat pipe fit-in portion. Moreover, the second heat pipe provided near the circuit element may be in contact with the circuit element through a radiator piece made of a predetermined plate material.

Further, the radiator portion may be a plate member extending under the palm rest section, and the first heat pipe may be connected with a part of the plate member. The radiator portion may be located in a higher portion than the radiator plate in a thickness direction of the housing, and the first heat pipe may be raised to the higher portion in the thickness direction and may be connected with the radiator portion. Locating the first heat pipe with its heat-releasing end raised may increasingly improve its radiative efficiency.

Further, an expansion unit detachably attachable for expanding a function of the information processor may be attached into the housing, and the first heat pipe may be located so as not to overlap the expansion unit.

Furthermore, according to the radiator mechanism for an information processor of the present invention, the first heat pipe may be provided along a cranked route between said radiator portion and a portion near the circuit element, the circuit element may be an integrated circuit element, and the first heat pipe may be located near the integrated circuit element. A heat pipe fit-in portion may be formed in accordance with a thickness of the second heat pipe on the radiator plate, and the second heat pipe may fit in the heat pipe fit-in portion. The radiator plate may be made of a metal plate extending under the keyboard section.

Other objects and further features of the present invention will become readily apparent from the following description of the embodiments with reference to accompanying drawings.

DETAILED DESCRIPTION OF INVENTION

A detailed description will now be given of an exemplified embodiment of the radiator mechanism for the information processor according to the present invention, with reference to the drawings. This embodiment exemplifies the radiator mechanism provided in the notebook personal computer ("PC"), and a description will now be given of the notebook PC with reference to FIGS. 1 and 2.

Figure 1:
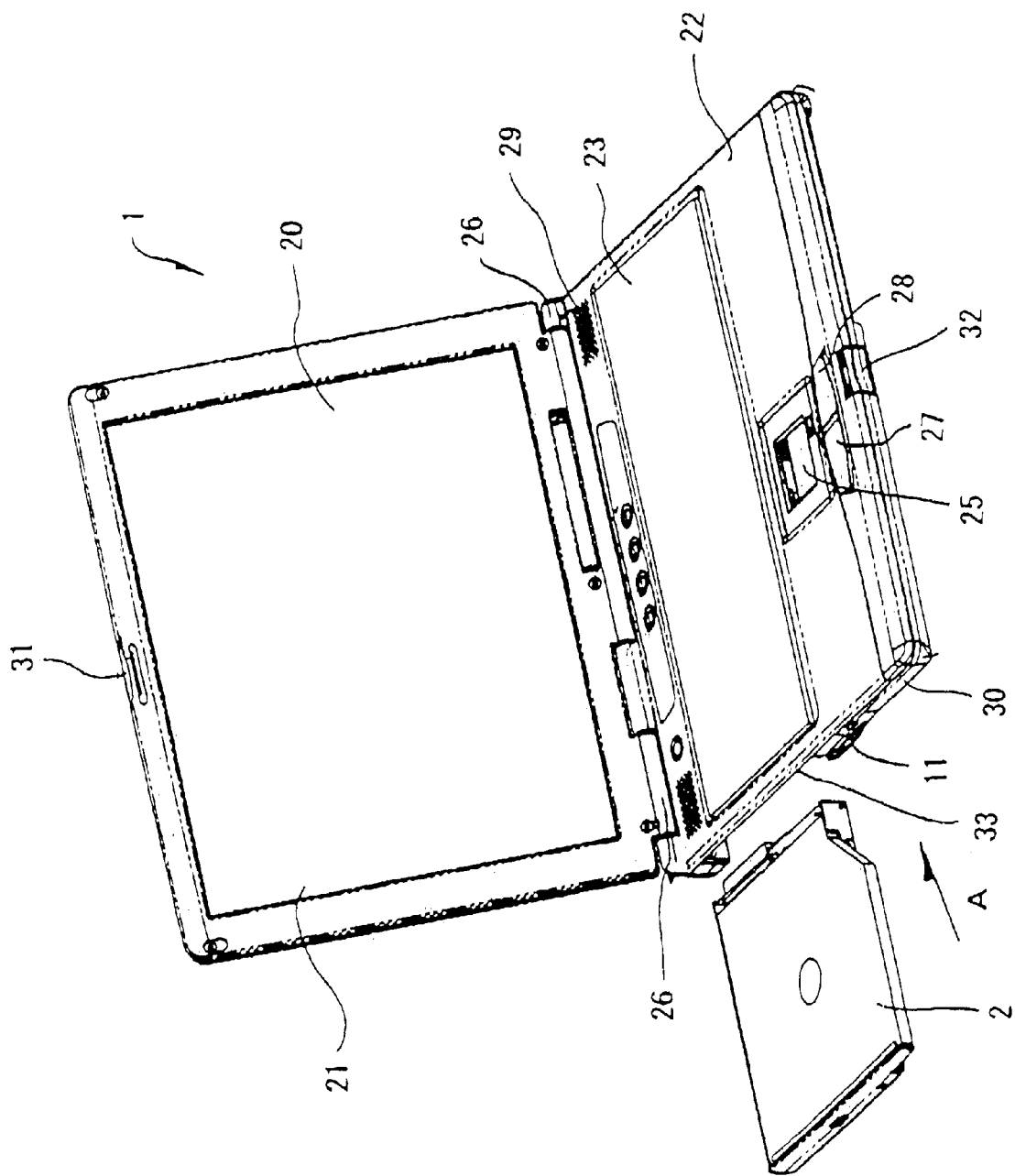
FIG. 1 is a perspective view of a portable computer with an expansion unit in which a radiator mechanism for the portable computer according to the present invention is provided.

In FIG. 1, a computer 1 is a notebook PC that is configured to open and close via hinge mechanisms 26, 26. The computer 1 includes a display body 20 at one side that has a liquid crystal, display 21, and a keyboard body 22 at the other side that has a keyboard section for input portion 23. The display body 20 and keyboard body 22 have an approximately rectangular parallelepiped housing that may be bent via the hinge mechanisms 26. They close completely for portability purposes by engaging a latch mechanism 31 on the display side with a latch mechanism 32 on the keyboard side.

The keyboard section 23 is provided with a plurality of keys although its detailed illustration is omitted.

The keyboard body 22 which has a keyboard section 23 (the keyboard section 23 is provided with a plurality of keys although its detailed illustration is omitted) includes a palm rest section in front of the keyboard section 23, a touch pad section 25 at a position a little to the left of the midsection of the palm rest section, and a pair of buttons or a left button 27 and a right button 28 in front of the touch pad section 25. Without an external mouse connected, the computer is controllable by operating the touch pad section 25 and the buttons 27, 28. A pair of speakers 29 that give sounds are placed, as necessary, at corners on the keyboard body 22 between the keyboard section 23 and hinge mechanisms 26.

At a left-hand side portion 30 of the notebook PC having the above configuration, an insertion slot 33 into which to slide an expansion unit 2 is provided around the keyboard section 23, and the expansion unit 2 may be inserted into the computer 1 in a direction A in the drawing through the insertion slot 33.

Figure 2:
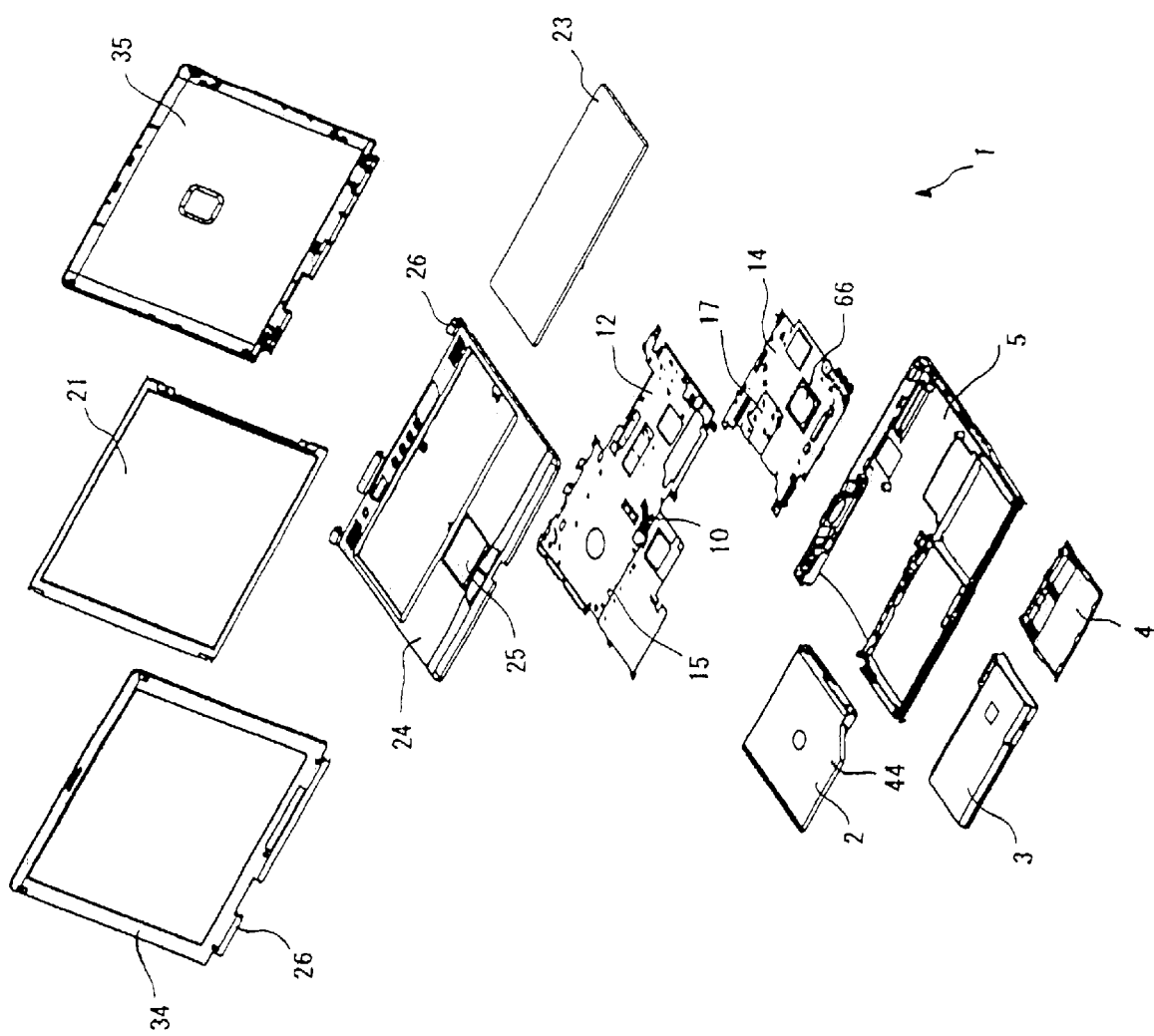
FIG. 2 is a perspective view of the portable computer.

FIG. 2 is an exploded perspective view of the portable computer 1 of the present embodiment. The display body 20 includes a front panel 34 and a back panel 35, which is so placed as to sandwich an approximately rectangular liquid crystal display device 21, the front panel 34 including an opening through which a screen of the liquid crystal display 21 is seen, the back panel 35 supporting the liquid crystal display 21 together and the front panel 34 together.

Unlike the configuration of the display body 20, the keyboard body includes a variety of parts. The keyboard body includes the keyboard section 23 on which a plurality of keys are arranged, the palm rest section 24 on which palms of user's hands are placed at key-in in front of the keyboard section 23, and the touch pad section 25 as a pointing device at a position a little to the left of the midsection of the palm rest section 25. A rear end of the keyboard body is connected with the display body 20, via the hinge mechanisms 26 to open and close the portable computer 1.

Moreover, provided in the keyboard body the expansion unit 2 is the expansion unit 2 detachably loaded from a left side of the computer 1. A position where the expansion unit 2 is attached from is a rear portion on the left side, and therefore the expansion unit 2, when loaded, is located nearly under the keyboard section 23. The expansion unit 2 has a part of its upper portion horizontally jut out to form a thin portion 44, and the insertion slot 33 additionally has an approximately rectangular opening cut away from upper right corner of its main rectangular opening to the right so as to accept the thin portion 44.

A battery unit 3 is detachably attached in front of the expansion unit 2. The battery unit 3 is located on the left side where the expansion unit 3 is loaded, and under the palm rest section 24. A lid portion 4 of a HDD is placed adjacent to the battery unit 3 under the palm rest section 24. The lid portion 4 is located on the right side under the palm rest section 24, and attached in such a manner as to open and close a bottom surface of a housing 5 in the keyboard body. The housing 5 in the keyboard body is provided with the radiator plate 12 made of metal such as aluminum and the main board 14 on which the CPU is mounted.

Figure 3:
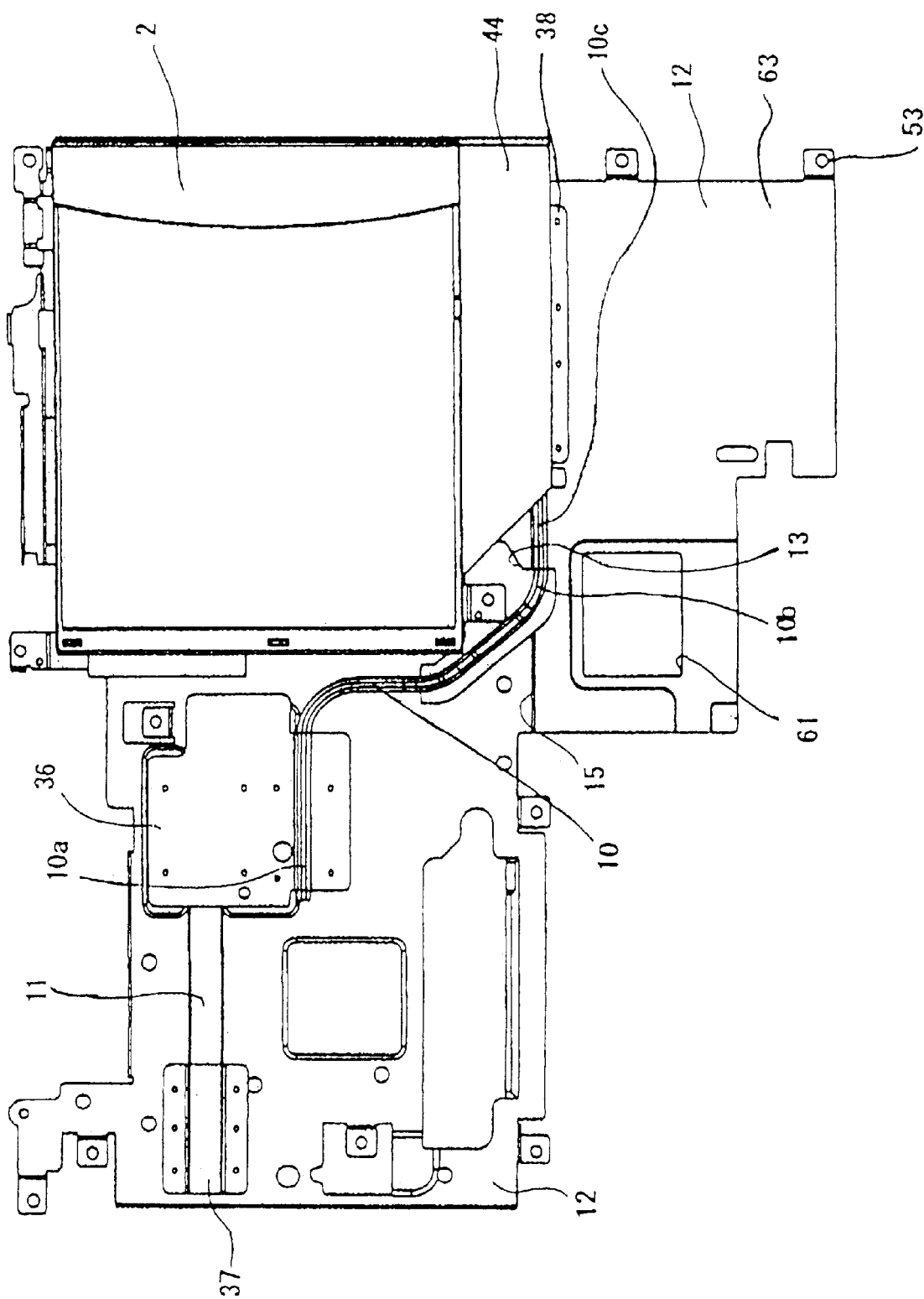
FIG. 3 is a bottom view of a radiator plate and an expansion unit provided in the portable computer viewed from its bottom.
Figure 4:
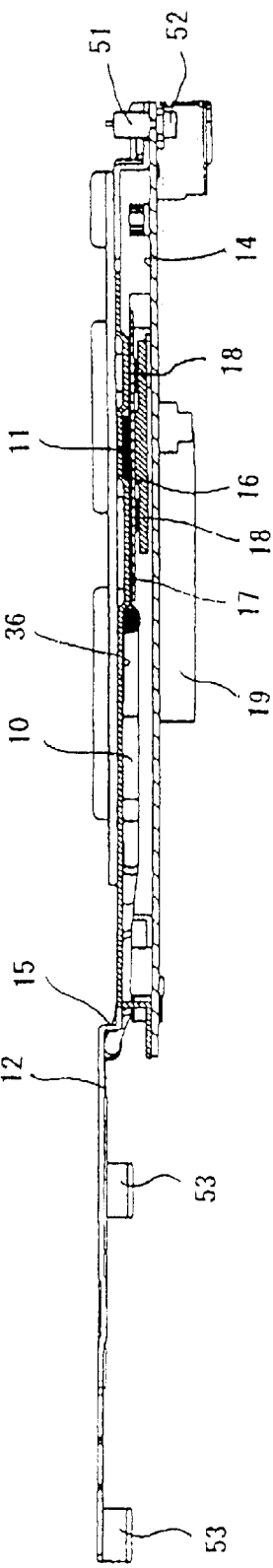
FIG. 4 is a sectional view of a principal portion of the radiator mechanism provided in the portable computer.

FIG. 3 is a bottom view of the radiator plate with the expansion unit 2 loaded. As shown at the right side of the drawing, the expansion unit 2, which is loaded to achieve a required function, has its partly thinner portion or the thin portion 44 is configured to be under a stepped portion 15 formed on the radiator plate 12. In a position in front of the stepped portion 15 on the radiator plate 12, a radiator portion 63 located on the battery unit 3 under the palm rest section 24 is formed in such a manner as to extend the radiator plate 12. At a left side (right side in the drawing as viewed from the bottom) of the radiator portion 63, a screw hole 53 for attaching the radiator plate 12 to the housing 5 in the keyboard body is formed, and in an area under the palm rest section, a touch pad area 61 corresponding to the touch pad section is formed. The radiator plate 12 also serves as a reinforcing plate.

Although no CPU is directly shown in FIG. 3, an overlay portion 36 made of a thin metal plate, a heatproof film, or the like is located in a position corresponding to the position of the CPU. Two heat pipes are routed from the overlay portion 36. One is a first heat pipe 10 provided along a cranked route, which extends from a front of the overlay portion 36 toward a horizontal direction, is bent in a direction at approximately right angles while keeping its extending direction horizontal, turns around a corner of the expansion unit 2, and further extends along the stepped portion 15 on the thin portion 44 of the expansion unit 2. The first heat pipe 10 is supported with a support portion 38 made of thin metal plate or a heatproof film at a portion along the stepped portion 15, or the radiator portion 10c. A straight portion 10a of the first heat pipe 10 absorbs heat from the CPU by positioning itself near the CPU, which is a circuit element (not shown), under the overlay portion 36. The straight portion of the first heat pipe 10 is routed while keeping in contact with a bottom surface of the radiator plate 12. The turn-around portion 10b of the heat pipe 10, when turning around the corner of the expansion unit 2, passes through a cutaway portion 13 formed on the radiator plate 12, and once leaving the radiator plate 12, extends along the stepped portion 15 of the radiator plate 12 again. The stepped portion 15 is a portion dedicated to form the radiator portion 63 by one step higher than a height of the radiator plate 12, and the radiative portion 10c of the first heat pipe 10 extends on the side of the radiator portion 63, so that the first heat pipe 10 extends, at the radiator portion 10c, to the one-step higher position. Hence, the heat pipe 10 is so placed as to gradually raise its position at the cutaway portion 13, and such variation of its height easily becomes possible because the radiator plate 12 does not make contact with the first heat pipe 10 at the cutaway portion 13. The variation of the height of the first heat pipe 10 may improve the radiator efficiency of the first heat pipe 10 as will be described later.

Another heat pipe is a second heat pipe 11, which is connected with the overlay portion 36 at one end and extends straight toward a right side (left side in the drawing as viewed from the bottom). The second heat pipe 11 has the form of a collapsed ellipse, and its spread bottom surface comes in indirect contact with the CPU (not shown) as a circuit element, so as to radiate heat produced in the CPU. The second heat pipe 11 passes right above the CPU, and extends along a bottom of the radiator plate 12. The other end of the second heat pipe 11 is supported in a support portion 37 made of a thin metal plate a heatproof film, or the like.

The CPU hereupon is a processor, exemplifying a heat-producing source, or a circuit element in the present embodiment. The circuit element is not limited to the CPU or processor, but may include a memory, or others; the present invention is also applicable to such a configuration.

Referring next to FIGS. 4 to 7 inclusive, a description will be given of a longitudinal sectional structure of a pair of the heat pipes: the first heat pipe 10 and the second heat pipe 11. In the keyboard body of the computer 1, a CPU 16 shaped like an approximately square figure in a plan view, and like a thin plate in section that juts out at its midsection is mounted on the top of the main board 14, and a connector 19 and other elements are mounted at a position displaced from the CPU on the bottom of the main board 14. The main board 14 and the radiator plate 12 are connected through screw members 51 and 52 to keep a clearance of a fixed distance. The CPU 16 mounted on the main board 14 generates heat as performing computation during its operation, but the heat is efficiently radiated through the first heat pipe 10 and the second heat pipe 11. On the top of the CPU 16, a thermal diffusion plate 17 is stuck with an adhesive 18 such as heatproof silicon grease. This thermal diffusion plate 17 is a metal plate having high thermal conductivity made of copper, aluminum, etc., for example. The heat diffusion plate 17 serves to absorb from its bottom surface the heat produced in the CPU 16, and to diffuse at its top surface the heat throughout the whole surface. With this thermal diffusion plate 17, the heat produced in the CPU 16 is easily absorbed into the second heat pipe 11 that passes immediately on the CPU 16, and also into the first heat pipe 10 that passes near the end of the thermal diffusion plate 17.

The above overlay portion 36 is provided on the thermal diffusion plate 17 that diffusing heat from the CPU 16, and a pair of heat pipes, or the first heat pipe 10 and the second heat pipe 11, is arranged in an area between the overlay portion 36 and the radiator plate 12. The radiator plate 12, as described above, has the shape of a flat plate, but have projections and depressions to increase an area in contact with the first heat pipe 10 and the second heat pipe 11. The projections and depressions also serve to accurately position and securely support the first heat pipe 10 and the second heat pipe 11 on the radiator plate 12.

A further description will be given of the projections and depressions on the radiator plate 12. Concave portions 71 and 72 are formed on both sides of the second heat pipe 11, the concave portion 72 is at a rear side of the straightly extending second heat pipe 11, and the concave portion 71 is between the second heat pipe 11 and the first heat pipe 10. The bottom surface of the concave portions 71 and 72 form a single surface constituting an approximately continuous surface with the bottom surface of the second heat pipe 11, and the overlay portion 39 on the heat diffusion plate 17 in this portion has a flat surface in its horizontal surface. An area between these concave portions 71 and 72 serves as a fit-in portion of the heat pipe in which the second heat pipe fits. Since the second heat pipe 11 is not simply in contact with a flat plate but sandwiched between the concave portions 71 and 72, the contact area is larger than that which is simply in contact therewith, which accordingly provides a high radiative coefficient. The first heat pipe 10 is located at a side opposite to the second heat pipe relative to the concave portion 71, this part of the first heat pipe 10. when attached, is accurately positioned according to the concave portion 71. The first heat pipe 10 has a little crushed spherical shape in section, and a side of the first heat pipe 10 is in contact with an uprising portion of the concave portion 71 of the radiator plate 12. On this uprising portion of the concave portion 71, the overlay portion 36 is formed under the first heat pipe 10, which is supported with the overlay portion 36.

Figure 5:
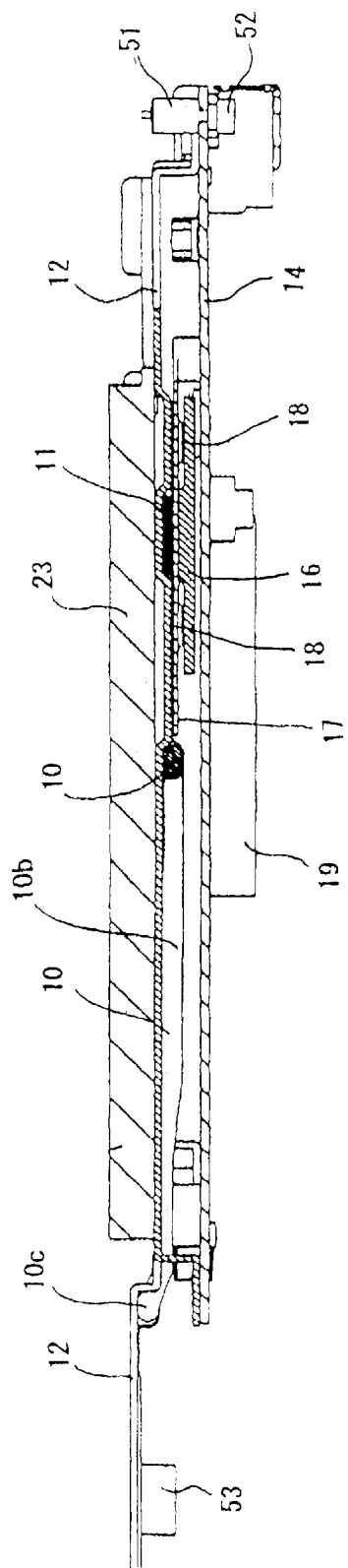
FIG. 5 is a sectional view of a principal portion of the radiator mechanism provided in the portable computer, illustrating a section of a keyboard section.

FIG. 5 illustrates a sectional view of the keyboard section 23 in addition to the radiator plate 12. A conventional keyboard section has a structure to form a thick aluminum plate for reinforcement at its bottom, but in the present embodiment, such a thick aluminum plate for reinforcement is removed, and the radiator plate 12 having projections and depressions instead supports the keyboard section 23 directly. Removing the thick aluminum plate for reinforcement as conventionally provided allows the keyboard section 23 to be made thin, thereby serving to reduce its size and weight of the computer 1. In addition, the radiator plate 12 used instead of the aluminum plate for reinforcement has a higher strength by the formation of a pair of the concave portions 71 and 72 than that shaped merely like a flat plate, and the keyboard section 23 can therefore be made slim without lowering in strength.

The first heat pipe 10, as shown in FIGS. 8 through 12, extends from an end of the thermal diffusion plate 17, turning around the corner of the expansion unit 2, to the radiator portion 63 that extends under the palm rest section 24. The radiator portion 63 is placed in a higher position than a position of the radiator plate 12 itself, and the first heat pipe 10 that transmits heat to the radiator portion 63 is supported so as to gradually rising in the cutaway portion 13 of the radiator plate 12. The heat pipe in general consists of a tube made of aluminum, stainless steel, copper, or other metal materials with an inner lining of wick-like capillary material such as glass fiber, meshed thin copper wire, and transfers heat by reducing pressure in the pipe, transferring heat-carrying vapors of such a fluid as freon, ammonium and water, and delivering latent heat. Thus, a high positioning of a heat-releasing end enhances its heat transfer efficiency, improving the efficiency in releasing heat. Accordingly, in the radiator mechanism of the present embodiment, the first heat pipe is arranged so that the heat-releasing end may be placed in a higher position, and its high heat transfer efficiency is secured.

The radiation may also be possible by making use of the radiator plate 12 under the keyboard section 23. However, in the present invention, the heat from the CPU 16 is transferred to the radiator plate 63 placed in a position other than under the keyboard section 23 via the heat pipe 10, and radiated in a position (the palm rest section 24 in the present embodiment) other than under the keyboard section 23. This allows the heat from the CPU 16 to transfer to a portion where no heat is generated in the portable computer, and makes a temperature distribution in the portable computer uniform. Moreover, since the heat from the CPU 16 is transferred to the palm rest portion 24 via the heat pipe 10, the heat from the CPU 16 is transferred to a portion which is relatively not so hot (or where not so much heat generates) in the present invention as would be if the radiator plate simply extends to the palm rest section 24, and the heat pipe does not extend to the palm rest section. The radiative efficiency is improved, accordingly.

On the other hand, if the radiator plate simply extends to the palm rest section 24, and the heat pipe does not extend to the palm rest section, as described above, a heat transfer of the palm rest section 24 to the radiator plate is not via the heat pipe but via the radiator plate, so that its heat distribution would not become uniform. Accordingly, the radiative efficiency in this configuration would decrease.

Moreover, the first heat pipe 10 is routed around the corner of the expansion unit 2, and extends further so as not to get into contact with the expansion unit 2, and is consequently arranged so as not to transfer its heat or adversely affect the expansion unit 2. Among various kinds of the expansion units 2, some may lose its operation stability by heat applied thereto, but no expansion unit 2 is affected by the heat from the first heat pipe 10 due to such an arrangement of the expansion unit 2 as to pass around the expansion unit 2.

Figure 6:
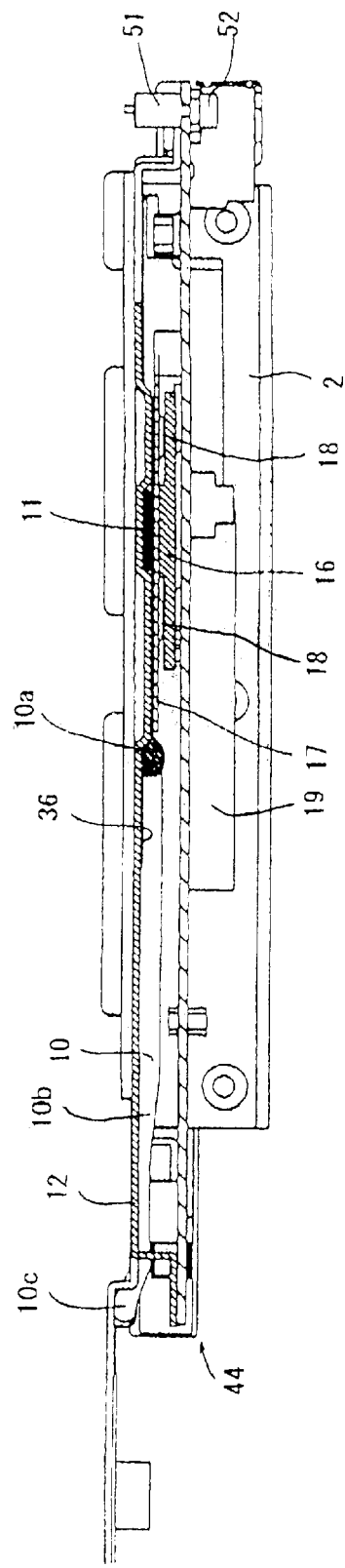
FIG. 6 is a sectional view of a principal portion of the radiator mechanism provided in the portable computer, to which a view of the expansion unit is added.
Figure 7:
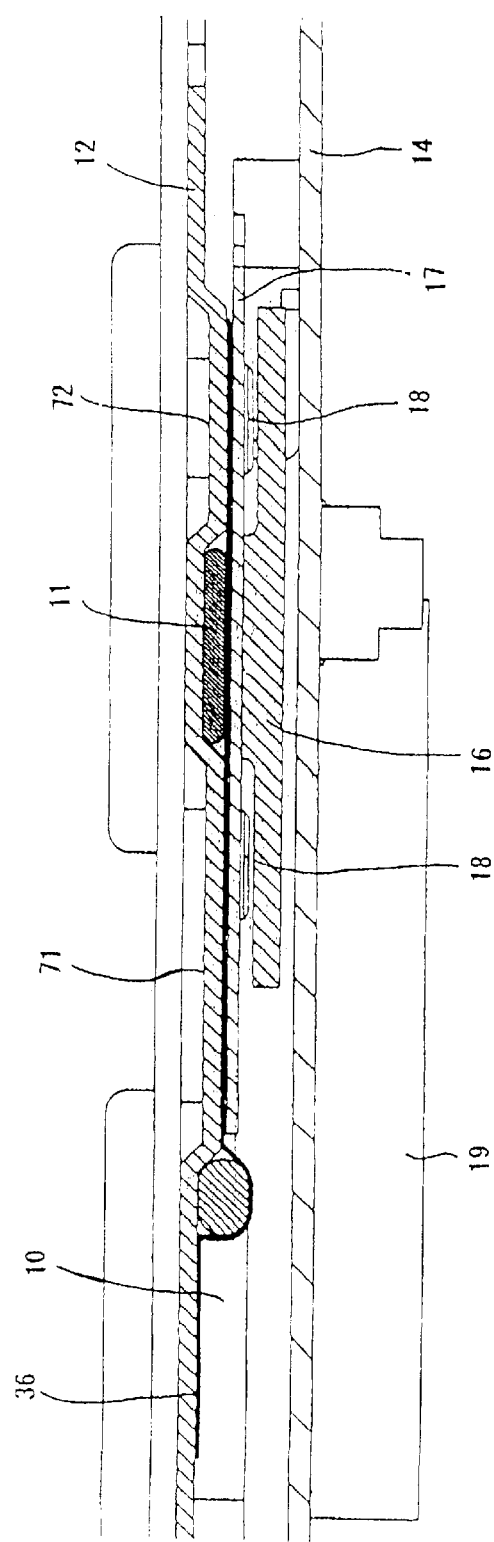
FIG. 7 is a sectional view of a principal portion near a CPU of the radiator mechanism provided in the portable computer.
Figure 8:
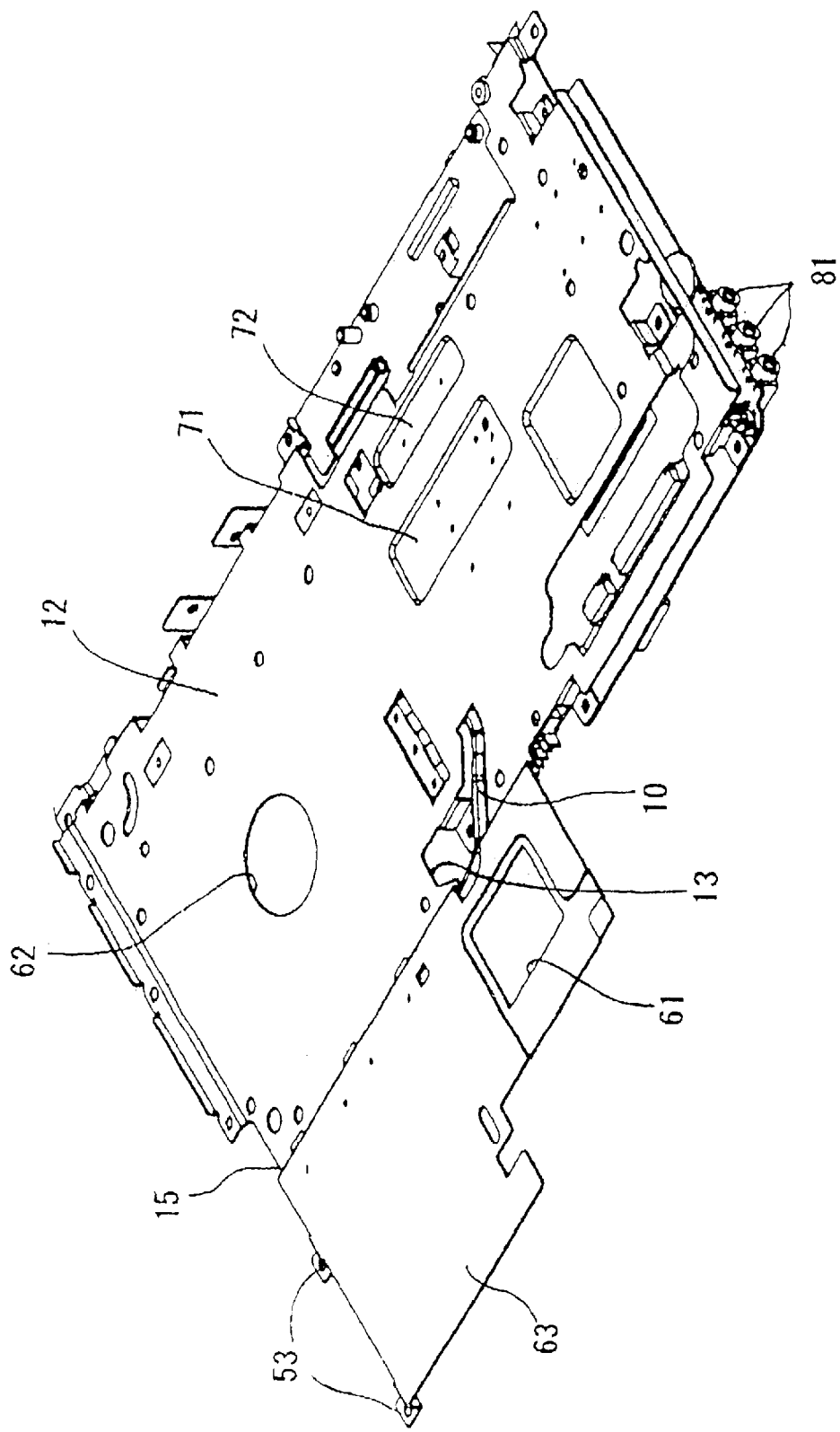
FIG. 8 is a perspective view of the radiator plate provided in the portable computer viewed from its top.
Figure 9:
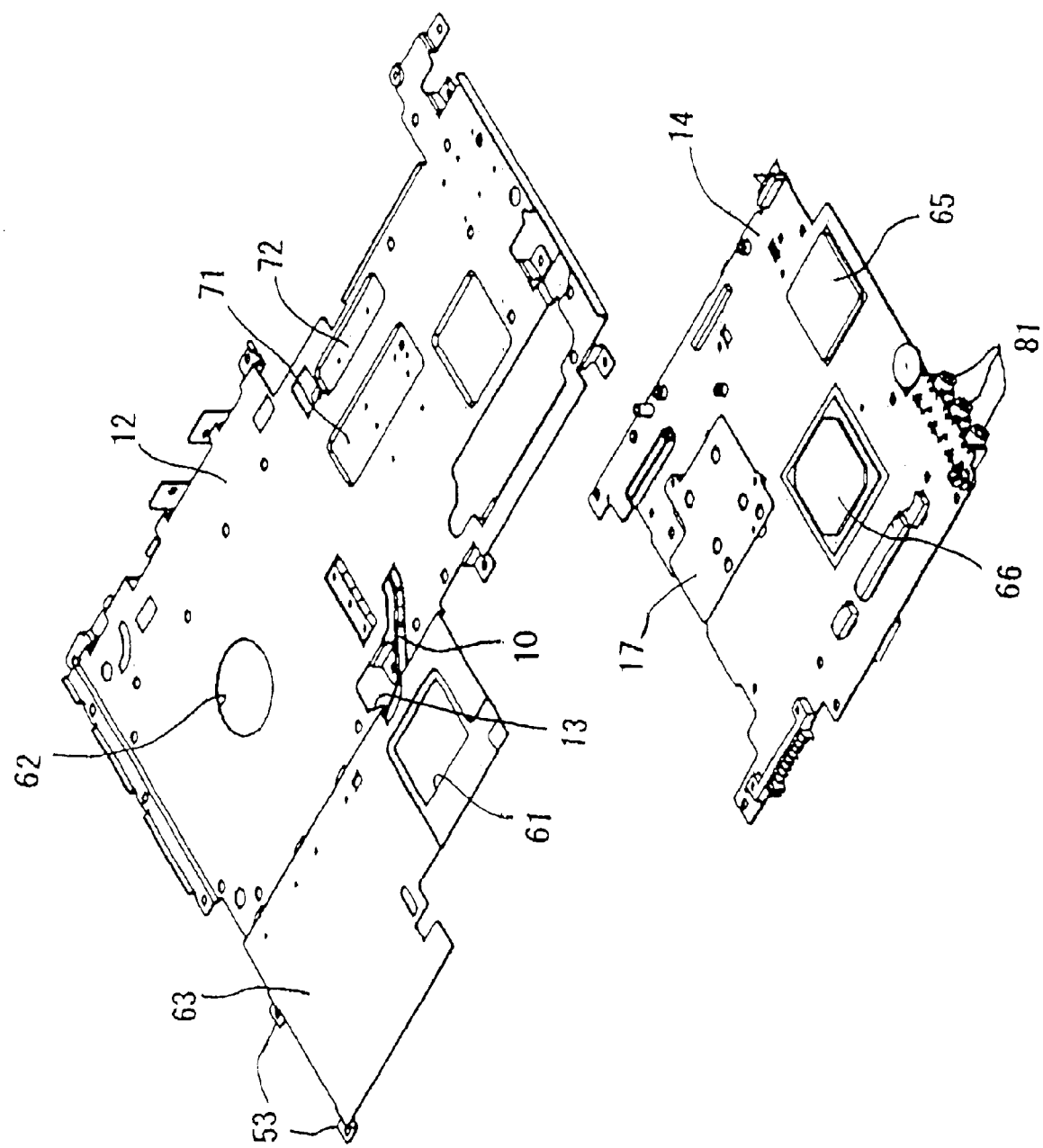
FIG. 9 is a perspective view of the radiator plate provided in the portable computer viewed from its top, or an exploded view of a main board provided with the CPU.
Figure 10:
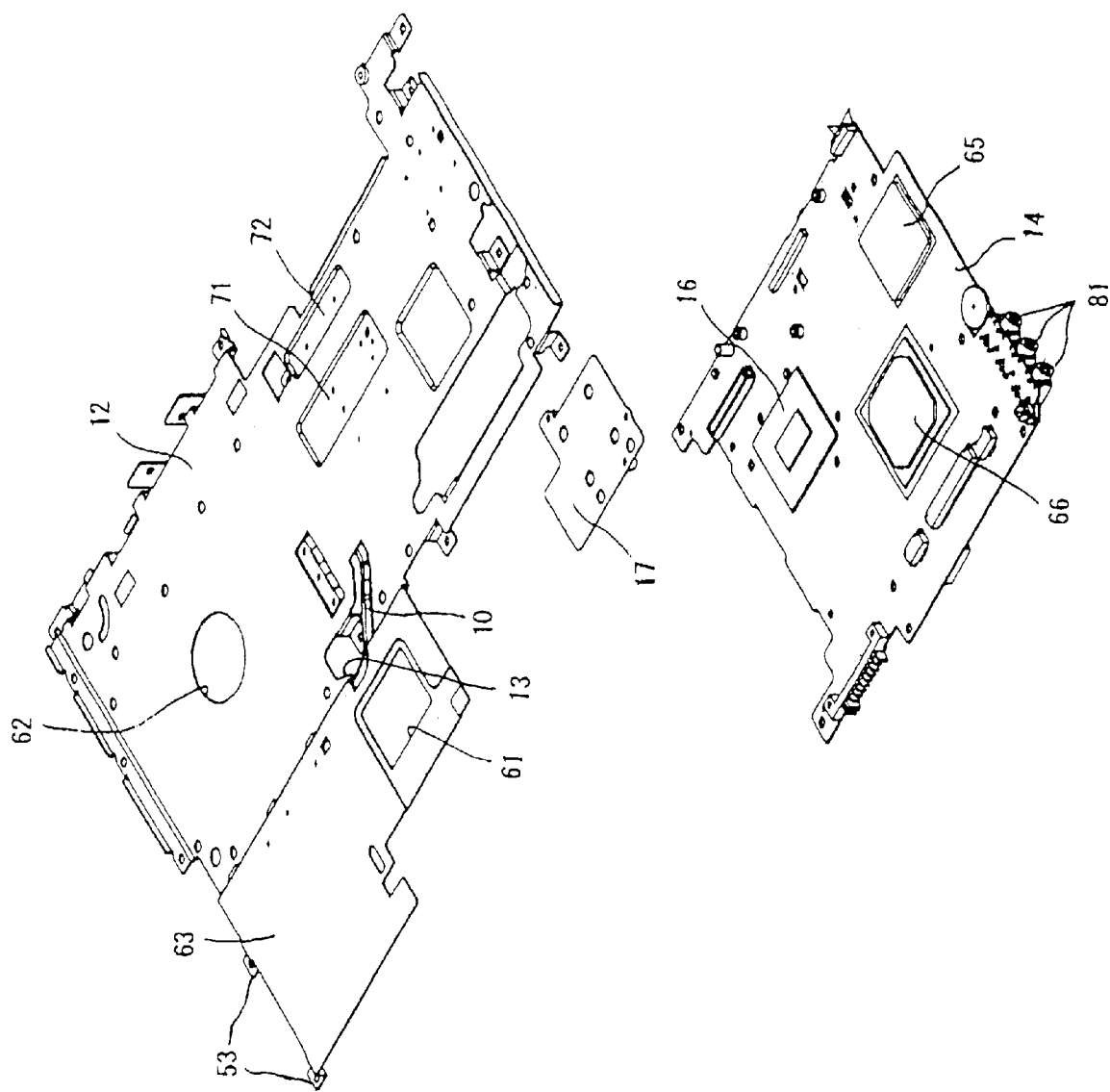
FIG. 10 is a perspective view of the radiator plate provided in the portable computer viewed from its top, or an exploded view of a main board and thermal diffusion plate provided with the CPU.
Figure 11:
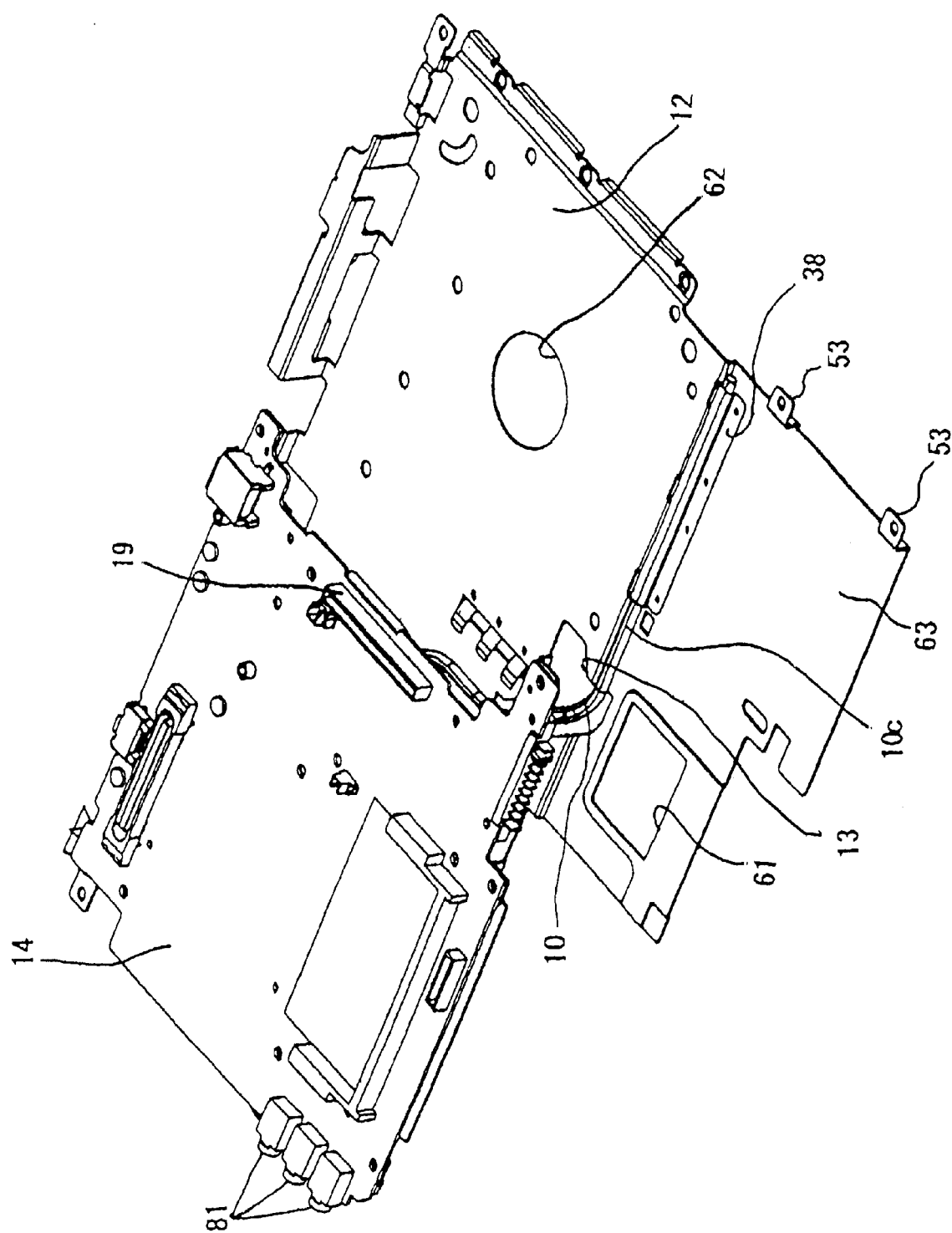
FIG. 11 is a perspective view of the radiator plate provided in the portable computer viewed from its bottom, or an exploded view of a main board and thermal diffusion plate provided with the CPU
Figure 12:
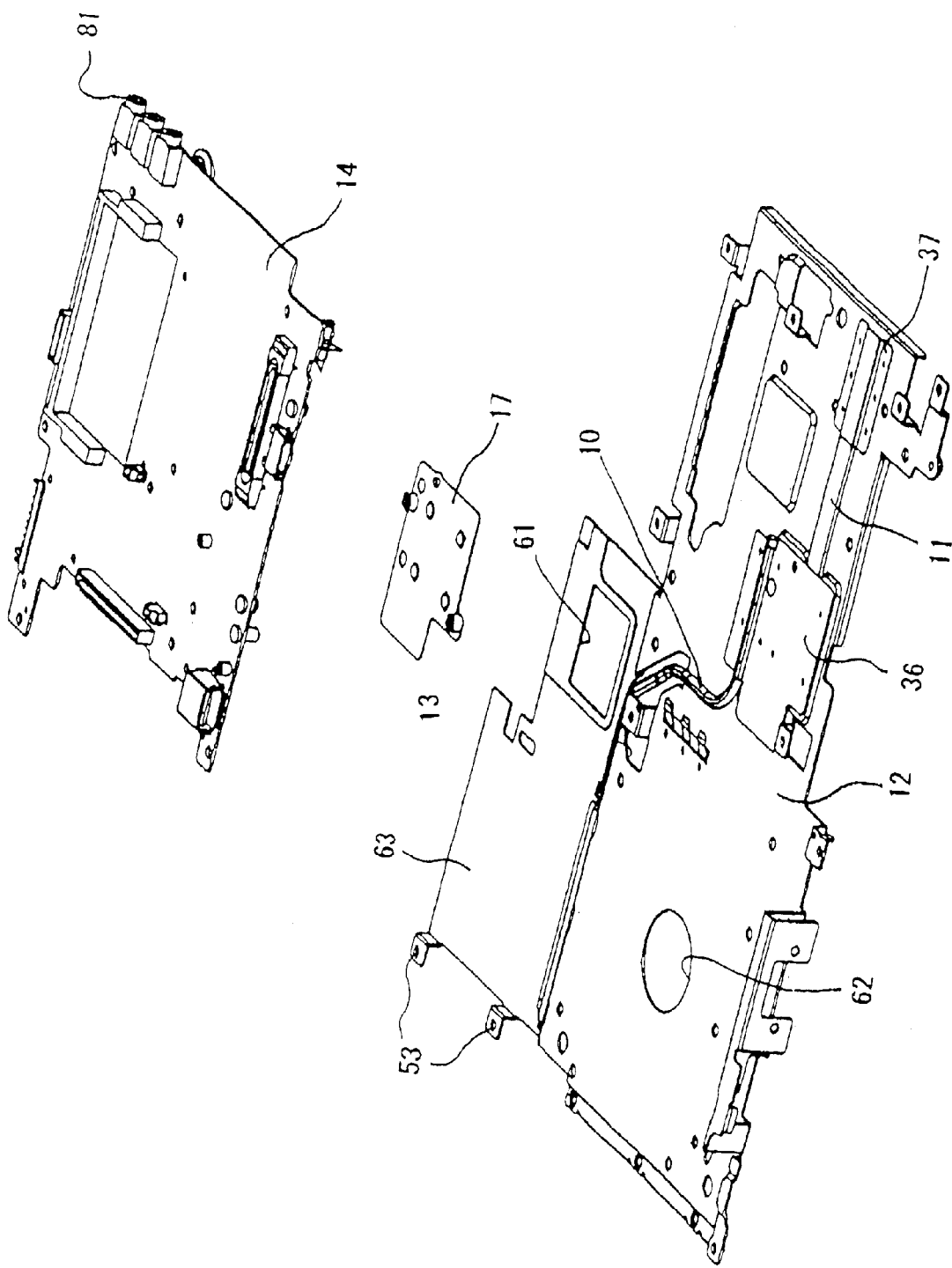
FIG. 12 is a perspective view of the radiator plate provided in the portable computer viewed from its bottom.

As described in FIG. 6, the first heat pipe 10 comes around the thin portion 44 of the expansion unit 4 at its portion 10c in FIG. 6. This becomes possible as the first heat pipe 10 is so arranged as to lie at some levels (to vary its height where it is placed). To be more specific, the first heat pipe avoids a collision with the expansion unit 2 by varying its height where it is placed. Therefore, the first heat pipe 10, if placed without varying its height where it is placed, should be arranged so that the expansion unit 2 is located under the first heat pipe 10, whereby the portable computer increases its thickness accordingly. Thus, the present invention serves to reduce the thickness of the portable computer. The present embodiment exemplifies a configuration in which the first heat pipe 10 passes around the expansion unit 2, but may be applied to other configurations in which it may pass around another element, such as a battery unit.

The radiator portion 63 that extends under the palm rest section 24 to which the first heat pipe 10 finally extends is located out of the keyboard section 23, whereby the keyboard section itself can be configured to have a thin housing.

Each of FIGS. 8 through 12 is a perspective view showing an exploded shape of the radiator plate 12 and the main board 14. Semiconductor chips 65 and 66 as circuit elements other than the CPU 16 are also arranged on the main board 14. The radiation for these elements may become possible by adding heat pipes. An audio jack 81 is provided at a side of the main board 14, and a round cutaway portion 62 is also formed in a portion the expansion unit 2 is mounted on.

In the above embodiment, a relatively high area for dissipating heat is the radiator portion 63 that is formed by extending the radiator plate 12, but such a radiator portion 63 as formed by bending the radiator plate 12 or by joining elements both having high thermal conductivity may also be usable. Further, a position of the radiator portion 63 is not limited to a portion under the palm rest section 24, and may also be placed under the keyboard section or near the hinge mechanisms 26 at the rear side of the computer, and the both may be adopted.

The radiator mechanism for the information processor according to the present invention includes the first heat pipe routed from an end of the thermal diffusion plate of the CPU, turning around a corner of the expansion unit, extending to the radiator portion that extends under the palm rest section.

What is claimed is:

1. A radiator mechanism for an information processor comprising:

a housing having a section in which an input portion is located;

a circuit element provided in said housing;

a radiator plate provided on said circuit element;

a first heat pipe provided on said radiator plate near said circuit element; and a radiator portion located outside the area of said input portion, wherein said first heat pipe is connected with said radiator portion, and radiates heat from said circuit element.

2. A radiator mechanism according to claim 1, wherein said input portion is a keyboard section.

3. A radiator mechanism according to claim 1, wherein said input portion is a keyboard section, said housing includes a palm rest section, and said radiator portion extends under said palm rest section.

4. A radiator mechanism according to claim 1, wherein a second heat pipe is provided near said circuit element between said circuit element and said radiator plate in addition to said first heat pipe.

5. A radiator mechanism according to claim 4, wherein said second heat pipe is located so that its bottom portion passes on said circuit element.

6. A radiator mechanism according to claim 4, wherein said second heat pipe provided near said circuit element is in contact with said circuit element through a radiator piece made of a predetermined plate material.

7. A radiator mechanism according to claim 4, wherein a heat pipe fit-in portion is formed in accordance with a thickness of said second heat pipe on said radiator plate, and said second heat pipe fits in said heat pipe fit-in portion.

8. A radiator mechanism according to claim 1, wherein said input portion is a keyboard section, said housing includes a palm rest section, said radiator portion is a plate member extending under said palm rest section, and said first heat pipe is connected with a part of said plate member.

9. A radiator mechanism according to claim 1, wherein said radiator portion is located in a higher portion than said radiator plate in a thickness direction of said housing, and said first heat pipe is raised to said higher portion in said thickness direction and is connected with said radiator portion.

10. A radiator mechanism according to claim 1, wherein an expansion unit detachably attachable for expanding a function of said information processor is attached into said housing, and said first heat pipe is located so as not to overlap said expansion unit.

11. A radiator mechanism according to claim 1, wherein said first heat pipe is provided along a cranked route between said radiator portion and a portion near said circuit element.

12. A radiator mechanism according to claim 1, wherein said circuit element is an integrated circuit element, and said first heat pipe is located near said integrated circuit element.

13. A radiator mechanism according to claim 1, wherein said radiator plate is made of a metal plate extending under said input portion.

14. A radiator structure for an information processor, having a housing including a section in which an input portion is located and a circuit element provided in said housing, said radiator structure comprising:

a radiator plate provided on said circuit element;

a first heat pipe provided on said radiator plate near said circuit element; and a radiator portion located outside the area of said input portion, wherein said first heat pipe is connected with said radiator portion to dissipate heat from said circuit element.

15. A radiator structure according to claim 14, wherein said input portion is a keyboard section, said housing includes a palm rest section, and said radiator portion extends under said palm rest station.

16. A radiator structure according to claim 14, wherein said radiator portion is located in a higher portion than said radiator plate in a thickness direction of said housing, and said first heat pipe is raised to said higher portion in said thickness direction and is connected with said radiator portion.

17. A radiator mechanism according to claim 1, wherein said radiator portion extends from said radiator plate.

18. A radiator structure according to claim 14, wherein said radiator portion extends from said radiator plate.

19. A radiator mechanism arranged for use in an information processor, the information processor having a circuit element and an input portion, said radiator mechanism comprising:

a radiator plate having a section arranged for placement on the circuit element and under the input portion of the information processor;

a heat pipe arranged for placement on said radiator plate and near said circuit element;

a radiator portion located outside the area of the radiator plate arranged for placement under the palm rest section of the information processor, wherein said radiator portion is arranged for connection with said heat pipe to radiate heat from the circuit element of the information processor.

20. A heat pipe arranged for use in an information processor, the information processor having a circuit element, an input portion, radiator plate, and radiator portion, said heat pipe comprising:

a first portion arranged for placement on the radiator plate near the circuit element of the information processor; and a second portion arranged for placement on the radiator portion, located outside the area of the input portion of the information processor, the heat pipe arranged for transfer of heat from the circuit element to the radiator portion.

* * * * *